United States Patent
Harnetiaux

(10) Patent No.: US 10,028,422 B2
(45) Date of Patent: Jul. 24, 2018

(54) TOOL BAR PIVOT HINGE ASSEMBLY FOR AN AGRICULTURAL IMPLEMENT

(71) Applicant: CNH Industrial America LLC, New Holland, PA (US)

(72) Inventor: Travis Lester Harnetiaux, Bourbonneais, IL (US)

(73) Assignee: CNH Industrial America LLC, New Holland, PA (US)

(*) Notice: Subject to any disclaimer, the term of this patent is extended or adjusted under 35 U.S.C. 154(b) by 170 days.

(21) Appl. No.: 15/066,853

(22) Filed: Mar. 10, 2016

(65) Prior Publication Data

US 2017/0258000 A1  Sep. 14, 2017

(51) Int. Cl.
*A01C 5/06* (2006.01)
*A01C 7/08* (2006.01)
*A01B 63/00* (2006.01)

(52) U.S. Cl.
CPC ............ *A01B 63/002* (2013.01); *A01C 5/062* (2013.01); *A01C 5/068* (2013.01); *A01C 7/08* (2013.01)

(58) Field of Classification Search
CPC .. A01C 5/062; A01C 5/06; A01C 5/00; A01C 5/068; A01C 5/066; A01C 7/08; A01C 7/00; A01B 63/002; A01B 63/00
See application file for complete search history.

(56) References Cited

U.S. PATENT DOCUMENTS

| | | | |
|---|---|---|---|
| 4,074,766 A | 2/1978 | Orthman | |
| 4,561,505 A | 12/1985 | Williamson | |
| 4,632,417 A | 12/1986 | Hadapp | |
| 5,203,540 A | 4/1993 | Lee | |
| 5,540,290 A | 7/1996 | Peterson et al. | |
| 9,097,326 B2 | 8/2015 | Juan et al. | |
| 2009/0229501 A1* | 9/2009 | Jaime | A01B 73/065 111/55 |
| 2010/0126744 A1 | 5/2010 | Poole | |

* cited by examiner

*Primary Examiner* — Christopher J. Novosad
(74) *Attorney, Agent, or Firm* — Rebecca L. Henkel; Rickard K. DeMille

(57) ABSTRACT

An agricultural implement system includes a tow bar configured to couple to a hitch assembly. The agricultural implement system also includes a tool bar pivot hinge assembly comprising two pivot points. The agricultural implement system additionally includes a first tool bar member mechanically coupled to a second tool bar member via the tool bar pivot hinge assembly; the first tool bar member extending transversely from the tow bar, wherein the tool bar pivot hinge assembly provides for an axis of rotation of the second tool bar member about the first tool bar member and additionally provides for an extension of the second tool bar member away from the first tool bar member.

20 Claims, 8 Drawing Sheets

TOOL BAR PIVOT HINGE ASSEMBLY FOR AN AGRICULTURAL IMPLEMENT

BACKGROUND

The invention relates generally to agricultural implements. Specifically, the embodiments disclosed herein generally relate to tool bar pivot hinge assemblies for agricultural implements.

Many types of farming implements are used for a variety of tasks, such as tilling, planting, and harvesting. For example, seeders and planters are agricultural implements that include devices that create a trench in soil, deposit seeds into the trench, and fill the trench. A seeding/planting agricultural implement may include a central section or bar coupled to a tow bar and wing assemblies coupled to either side of the tow bar. The wing assemblies typically include tool bars that extend from the tow bar, row units that perform the farming operation and are mounted on the tool bars, and supporting wheel assemblies disposed along the length of the tool bars.

During the farming operation, the row units and wheel assemblies may be configured to "float." That is, the row units and wheel assemblies may be configured such that the row units contact the soil with sufficient force to deposit seeds into the soil at a desired depth while also allowing the wing tool bars to traverse various kinds of terrain. During transport, the wing tool bars may be folded forwardly to reduce the width of the agricultural implement. During turns, the wing tool bars may slightly raise while the wheel assemblies support the end of the wing tool bars. The wheel assemblies may also support each end of the wing tool bars during folding and unfolding.

However, row units may be in close proximity to each other, for example, to increase crop yield. This closer spacing may limit the amount of travel a wing can go up and down. For example, as the wing drops down the row unit closest to a pivot may abut the adjacent row unit on the other side of the pivot. This limited wing travel may result in the row units not fully following the contours of the field as desired. Accordingly, it would be beneficial to improve the pivoting capabilities included in tool bars to more evenly follow the contours of the field.

BRIEF DESCRIPTION

In one embodiment, agricultural implement system includes a tow bar configured to couple to a hitch assembly. The agricultural implement system also includes a tool bar pivot hinge assembly comprising two pivot points. The agricultural implement system additionally includes a first tool bar member mechanically coupled to a second tool bar member via the tool bar pivot hinge assembly; the first tool bar member extending transversely from the tow bar, wherein the tool bar pivot hinge assembly provides for an axis of rotation of the second tool bar member about the first tool bar member and additionally provides for an extension of the second tool bar member away from the first tool bar member.

In another embodiment, an agricultural implement system includes a tow bar configured to couple to a hitch assembly. The agricultural implement system additionally includes a tool bar pivot hinge assembly comprising a first end member, a second end member, and a hinge member rotatively attached to the first and the second end members. The agricultural implement system also includes a first tool bar member mechanically coupled to a second tool bar member via the first end member and the second end member; the first tool bar member extending transversely from the tow bar, wherein the tool bar pivot hinge assembly provides for an axis of rotation of the second tool bar member about the first tool bar member and additionally provides for an extension of the second tool bar member away from the first tool bar member.

In a further embodiment, a system includes an agricultural implement system including a tow bar configured to couple to a hitch assembly. The agricultural implement system further includes a tool bar pivot hinge assembly comprising two pivot points. The agricultural implement system also includes a first tool bar member mechanically coupled to a second tool bar member via the tool bar pivot hinge assembly; the first tool bar member extending transversely from the tow bar, wherein the tool bar pivot hinge assembly provides for an axis of rotation of the second tool bar member about the first tool bar member and additionally provides for an extension of the second tool bar member away from the first tool bar member. The agricultural implement system additionally includes a control system operatively coupled to the tool bar pivot hinge assembly and configured to rotate the second tool bar member about the first tool bar member; and to extend the second tool bar member away from the first tool bar member.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Wing wheel assemblies are generally employed on agricultural implements to support the implement during various modes of operation (e.g., while turning at a headland, while operating in a planting mode, while transporting the implement, etc.). The wing wheel assemblies may include tool bars that include certain row units useful, for example, in carrying seeding devices. It is beneficial for wing wheel assemblies and tool bars to follow contours of the ground. The wings wheel assemblies may follow these contours by pivoting up or down on a fixed axis. However, row unit may include a small spacing between them, for example, to improve seed deposition and crop yield. Because of small spacing, an amount of travel that a wing wheel assembly can perform (e.g., vertical travel), may be reduced by design to prevent abutment of row units against each other. As the tool bar drops down towards the ground, the row unit closest to a pivot can contact an adjacent row unit disposed on the other side of the pivot.

To address these structural concerns, the tool bar systems of certain embodiments disclosed herein include a pivot link that may attach to, for example, a center tool bar and wing tool bar. Pivot points in the pivot link described herein may allow various positioning of the tool bar system, such as vertical positioning and perpendicular positioning, as described in more detail below. In one embodiment, two actuatable cylinders are attached to the pivot link. Each cylinder may include a linear position sensor suitable for sensing a stroke or extension current in each cylinder. A control system may then actuate one or more of the cylinders to "push" and/or "pull" on the pivot link, causing the tool bar to move vertically up and down, as well as outwardly or inwardly from the link. Accordingly, the tool bar mare more comfortably follow contour of the ground, prevent row units from contacting each other, and provide for a row unit spacing that may result in more even row plantings.

Figure 1:
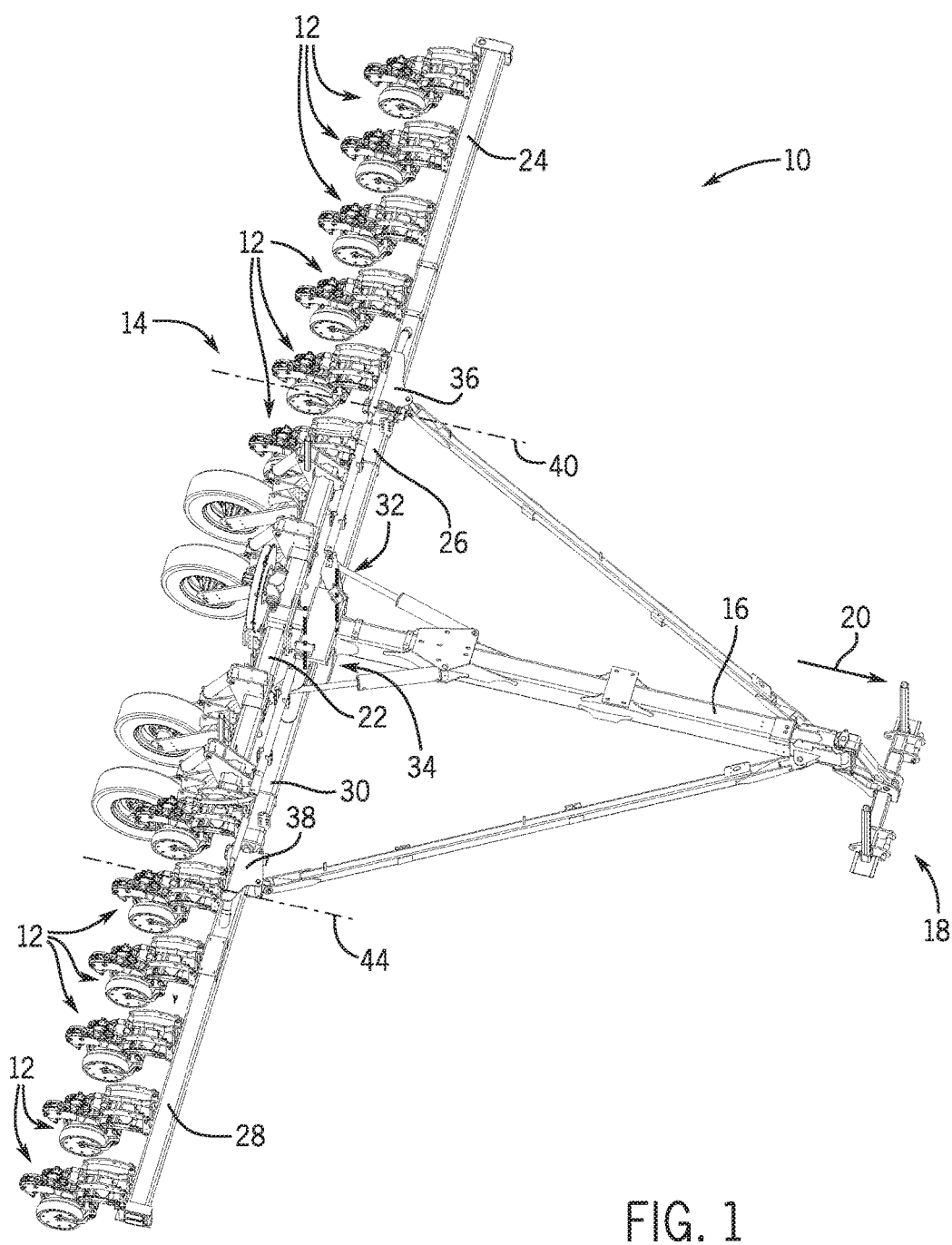
FIG. 1 is a perspective view of an agricultural implement that may include pivot hinge assemblies suitable for pivoting and extending certain bar members.

With the foregoing in mind, FIG. 1 is a perspective view of an agricultural implement 10 in the form of a planter. The agricultural implement 10 may be coupled to a work vehicle, such as a tractor, and may be configured to be towed behind the work vehicle. Although the embodiments described below are described in relation to a planter, it should be appreciated that the present embodiments may be applied to other types of wide agricultural implements.

Turning now to the drawings, FIG. 1 is a perspective view of an embodiment of an agricultural implement system 10 configured to deposit seeds into soil. In the illustrated embodiment, the agricultural implement system 10 includes row units 12 configured to open the soil, dispense seeds into the soil opening, and reclose the soil as the implement system 10 moves through a field. For example, in certain embodiments, each row unit 12 includes a ground engaging tool or opener that forms a seeding path (e.g., trench) for seed deposition into the soil. The opener is followed by a seed tube configured to direct seeds and/or other agricultural products (e.g., fertilizer, etc.) into the trench. Closing discs may be positioned behind the seed tube for moving the soil back into the trench, and/or a packer wheel may be coupled to a rear portion of the row unit to pack the soil on top of the deposited seeds. While the agricultural implement system 10 includes 16 row units 12 in the illustrated embodiment, it should be appreciated that in alternative embodiments, the agricultural implement system may include more or fewer row units. For example, in certain embodiments, the agricultural implement system may include 6, 8, 10, 12, 14, 16, 18, 20, 22, 24, or more row units.

As illustrated, the row units 12 are coupled to a tool bar assembly 14. The tool bar assembly 14, in turn, is coupled to a tow bar assembly 16, which includes a hitch assembly 18. The hitch assembly 18 is configured to couple the agricultural implement system 10 to a tow vehicle, such as a tractor or other prime mover. Accordingly, the tow vehicle may move the agricultural implement system 10 across a field in a direction of travel 20. As discussed in detail below, the tow bar assembly 16 is configured to elongate as wings of the tool bar assembly rotate from the illustrated working position toward a transport position.

In the illustrated embodiment, the tool bar assembly 14 includes a central tool bar 22, a first wing tool bar 24, a first wing support 26, a second wing tool bar 28, and a second wing support 30. The central tool bar 22 is rigidly coupled to the tow bar assembly 16, and the central tool bar 22 is configured to support four row units 12. However, it should be appreciated that the central tool bar may be configured to support more or fewer row units in alternative embodiments. The first and second wing supports 26 and 30 are pivotally coupled to the tow bar assembly 16 by first and second pivot joints 32 and 34, respectively.

The first and second pivot joints 32 and 34 enable the wing tool bars and the wing supports to rotate forwardly from the illustrated working position to a transport position. In the illustrated embodiment, one row unit 12 is coupled to each wing support. However, it should be appreciated that in alternative embodiments, more or fewer row units (e.g., 0, 1, 2, 3, 4, or more) may be coupled to each wing support. The first wing tool bar 24 is pivotally coupled to the first wing support 26 by a third pivot joint 36, and the second wing tool bar 28 is pivotally coupled to the second wing support 30 by a fourth pivot joint 38. The third and fourth pivot joints 36 and 38 enable the tool bar assembly 14 to bend or rotate about axes 40, 44 in response to variations in the surface of the soil. As further described below, the pivot joints 36 and/or 38 may be replaced by pivot hinge assemblies suitable for not only enabling rotation or bending of the tool bar assembly 14 vertically, but also positioning row units 12 so as to prevent row units 12 on either side of the pivot hinge assembly from contacting each other while maintaining a desired even spacing with respect to each other. In the illustrated embodiment, five row units 12 are coupled to each wing tool bar. However, it should be appreciated that more or fewer row units (e.g., 1, 2, 3, 4, 5, 6, 8, 10, or more) may be coupled to each wing tool bar in alternative embodiments.

Figure 2:
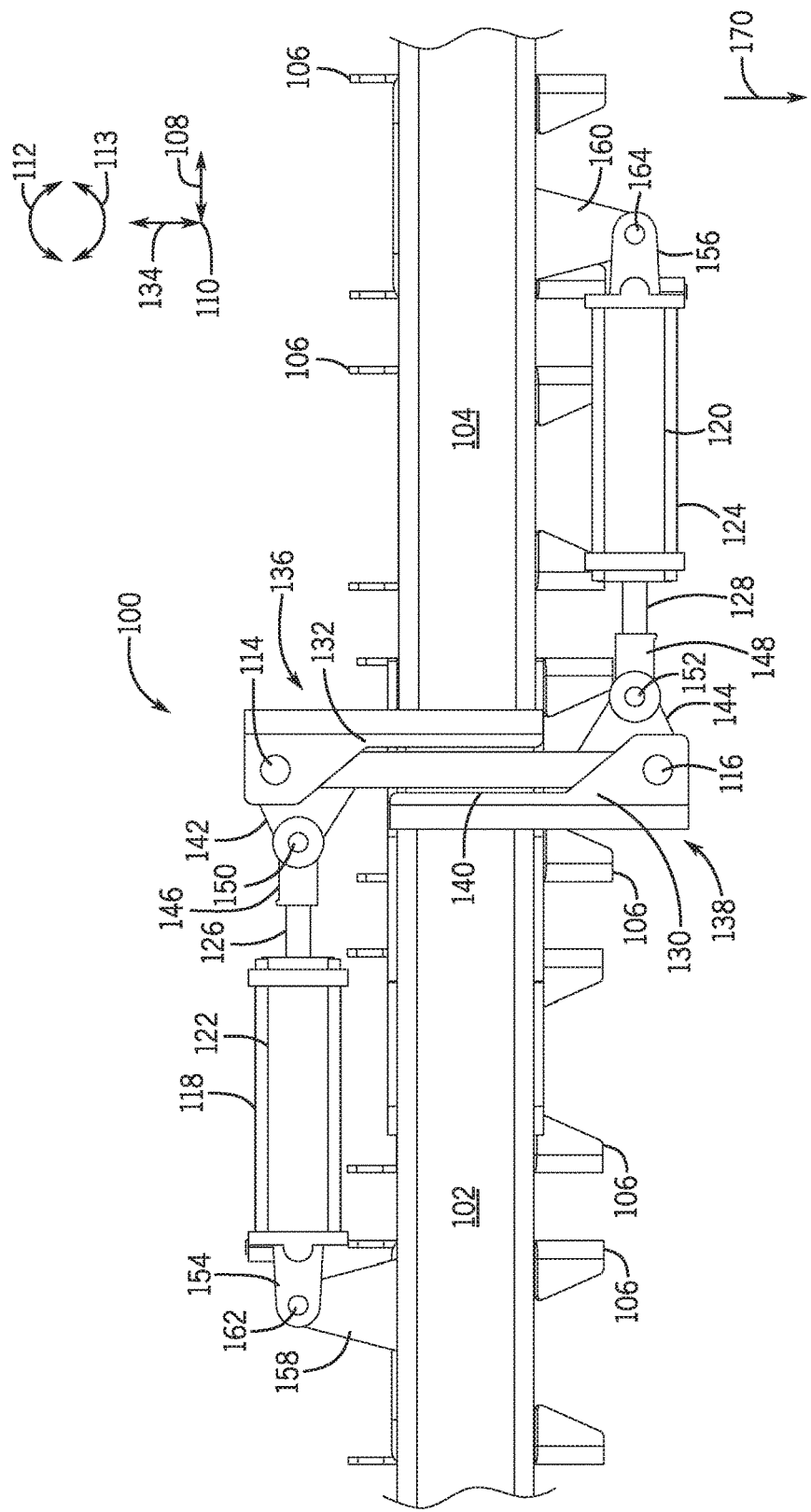
FIG. 2 is a front view of a pivot hinge assembly connecting two bar members, in accordance with an embodiment of the present approach.

Turning now to FIG. 2, is a front view illustrating an embodiment of a pivot hinge assembly 100 disposed on bar members 102, 104. Row unit 12 attachment members 106 are shown behind the bar members 102, 104, useful in attaching the row units 12 to the bar members 102, 104. In one embodiment, the bar member 102 may be a portion of the first wing support 26, while the bar member 104 may be a portion of the first wing tool bar 24. Accordingly, the pivot hinge assembly 100 is an alternative to the pivot joint 36. Likewise, the bar member 102 may be a portion of the second wing support 30, while the bar member 104 may be a portion of the second wing tool bar 28. Accordingly, the pivot hinge assembly 100 may also be an alternative to the pivot joint 38. Indeed, the pivot hinge assembly 100 may replace pivot joints 36 and/or 38 and used to comfortably bend the wing tool bars 24, 28 in response to variations in the surface of the soil. Accordingly, the row units 12 may maintain engagement with the soil as the agricultural implement system 10 encounters varying contours within the field.

In the depicted embodiment, the pivot hinge assembly 100 is depicted in a "closed" position, which enables the bar members 102, 104 to remain in a same horizontal position with respect to each other and parallel to an axis 108. Also shown is an axis 110, about which rotations 112, 113 of the bar members 102, 104, may occur. The pivot hinge assembly 100 includes two pivot points 114, 116, which may provide for rotation as well as extension as further described below. The pivot hinge assembly 100 also includes two actuators 118, 120. A control system described in more detail below in FIG. 9 may actuate the actuators 118, 120 to controllably rotate and/or extend the bar members 102, 104. In the depicted embodiment, the actuators 118, 120, are cylinders (e.g., hydraulic cylinders, pneumatic cylinders electrically positioned cylinders). However, other embodiments may use other linear actuators such as lead screws, screw jacks, ball screws, and so on. The actuators 118, 120 may each include one or more sensors 122, 124. For example, the sensors 122, 124 may sense linear extension or position of pistons 126, 128, included in the cylinders 118, 120.

Each bar member 102, 104 includes an end member 130, 132 that may be welded or otherwise manufactured onto end portions of the bar members 102, 104, respectively. Each end member 130, 132 may include sections 136, 138 that protrude outwardly from the bar members 102, 102 in an axial direction 134, for example, to a height more suitable for engaging pistons 126, 128. The pistons 126, 128, may be pivotably coupled to the end members 130, 132, via a hinge member 140 having extensions 142, 144. The extensions 142, 144 may be pivotably coupled to the pistons 126, 128, via pivotable piston end members 146, 148, thus defining pivots 150, 152. The actuators 118, 120 may also be pivotably coupled to the bar members 102, 104 via actuator end members 154, 156. The actuator end members 154, 156 may be pivotably coupled to the bar members 102, 104 via bar protrusions 158, 160, thus defining pivots 162, 164.

Figure 3:
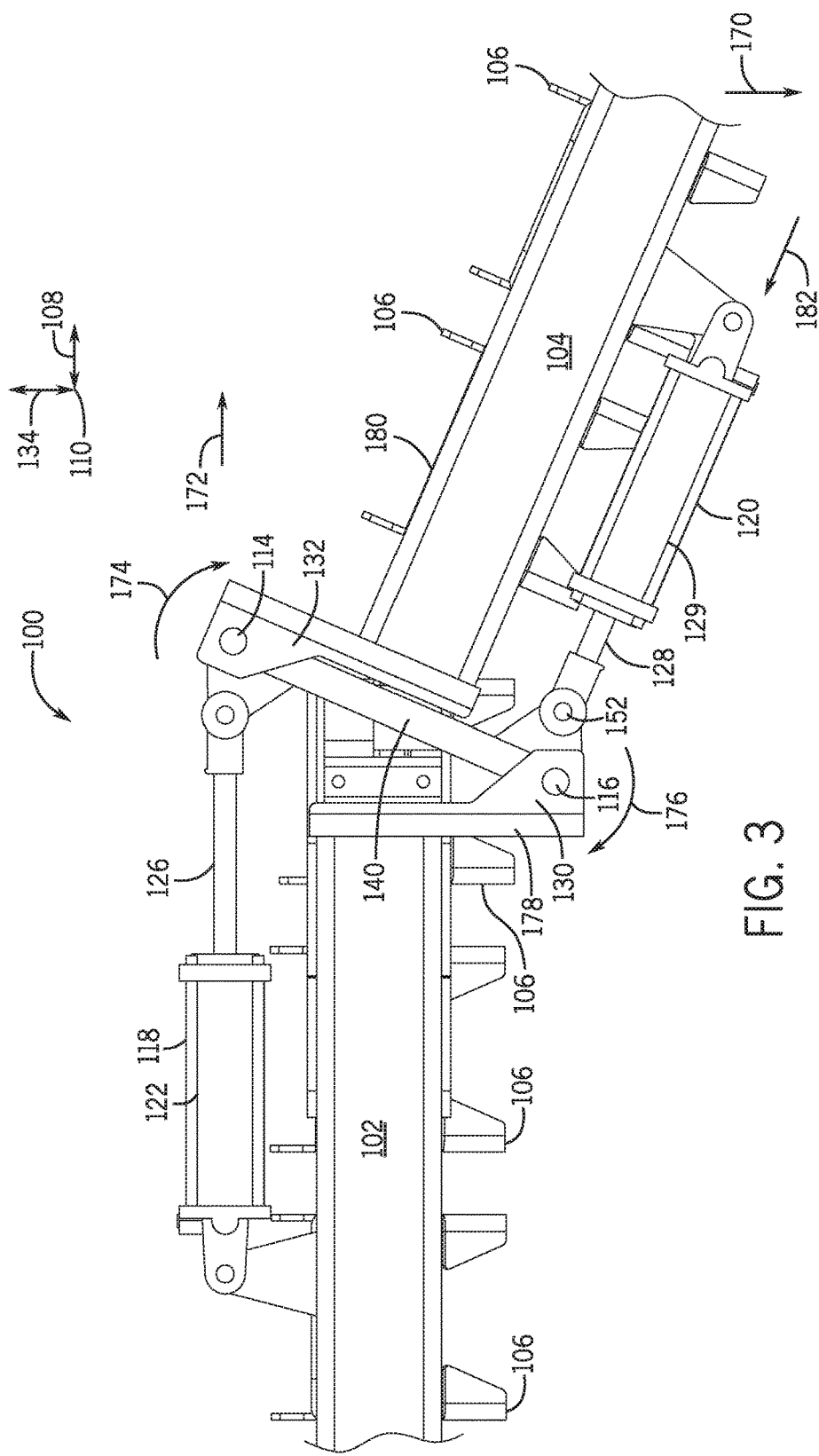
FIG. 3 is a front view of a pivot hinge assembly of FIG. 2 with a tool bar member pivoted towards the ground, in accordance with an embodiment of the present approach.

In operation, the bar members 102, 104 may rotate about axis 110, which, for example, may correspond to axis 40 and/or 44 when the pivot hinge assembly 100 is used in lieu of pivot joints 36, 38 shown in FIG. 1. During operations such as planting, the bar member 104 may be lowered towards ground in a direction 170. For example, as shown in FIG. 3. More specifically, FIG. 3 illustrates an embodiment of the pivot hinge assembly 100 having the bar member 104 pivoted towards ground. Because FIG. 3 includes like elements to FIG. 2, the like elements are illustrated with like element numbers. More specifically, FIG. 3 illustrates bar member 104 lowered in the direction 170 by maintaining the actuator in a "locked" position (e.g., with piston 128 fixed) while actuating the piston 126 of the actuator 118 to extend further outward. Extension of the piston 126 may thus "push" the bar member 104 outwardly in a direction 172, causing end member 132, in combination with a weight of the bar member 104, to pivot the bar member 104 in the direction 170 to more comformably follow ground contours.

Indeed, by locking the piston 128 and by extending the piston 126, the bar member 104 may rotate in a direction 174 with respect to the pivot 114 and in a direction 176 with respect to the pivot 116. Likewise, as the bar member 104 rotates, the end member 132 may rotate in the direction 174 with respect to the pivot 114 and the piston 128 may rotate in the direction 176 with respect to the pivot 152. Also shown are the row unit attachment members 106.

As illustrated, the pivoting of the bar member 104 via the pivot hinge assembly 100 may respect distances between row unit attachment members 106, such as between row unit attachment members 178 and 180, to prevent contact between the members 178, 180. For example, as the piston 126 extends, the sensor 122 may signal that a desired extension has been reached, and a control system described in more detail below may then stop actuating the piston 126 and begin actuating the piston 128. The piston 128 may then move outwardly in a direction 182 parallel to the bar member 104 and "push" out against the end member 130 attached to the bar member 102, extending the bar member 104 away from the bar member 102. The actuation of the piston 128 may thus provide for extra clearance between row unit attachment members 178 and 180, as illustrated in FIG. 4.

Figure 4:
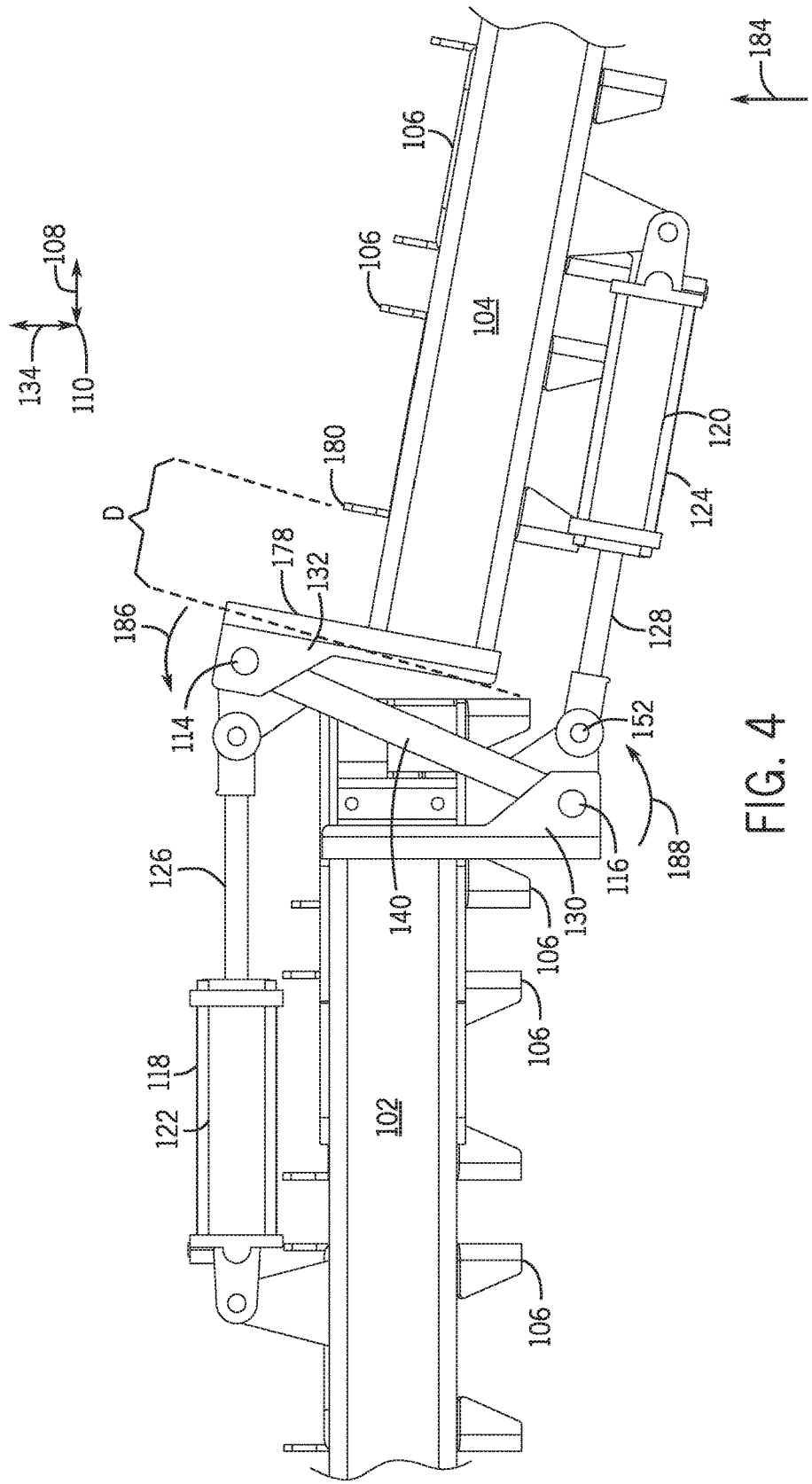
FIG. 4 is a front view of a pivot hinge assembly of FIG. 2 with a tool bar member pivoted towards ground and extended to respect a distance D between row unit attachment members, in accordance with an embodiment of the present approach.

More specifically, FIG. 4 illustrates an embodiment of the pivot hinge assembly 100 having the bar member 104 pivoted towards ground and extended to respect a distance D between row unit attachment members 178 and 180. Because FIG. 4 includes like elements to FIGS. 2 and 3, the like elements are illustrated with like element numbers. In the depicted embodiment, the piston 128 is shown as extended when compared to FIG. 3, thus providing for the distance D.

When the piston 126 is kept locked and the piston 128 is extended, the bar member 104 may move in a direction 184. Accordingly, the bar member 104 may rotate in a direction 186 about the pivot 114 and in a direction 188 about the pivot 116. Likewise, as the bar member 104 rotates, the end member 132 may rotate in the direction 186 with respect to the pivot 114 and the piston 128 may rotate in the direction 188 with respect to the pivot 152. Once the sensor 124 provides a signal representative of a desired extension for the piston 128, the actuation of the piston 128 may stop and the agricultural implement 10 may be towed across a field during, for example, planting operations. Once an end of a planting row is reached, the bar member 104 may be raised, for example, to turn to an adjacent row, as shown in FIG. 5.

Figure 5:
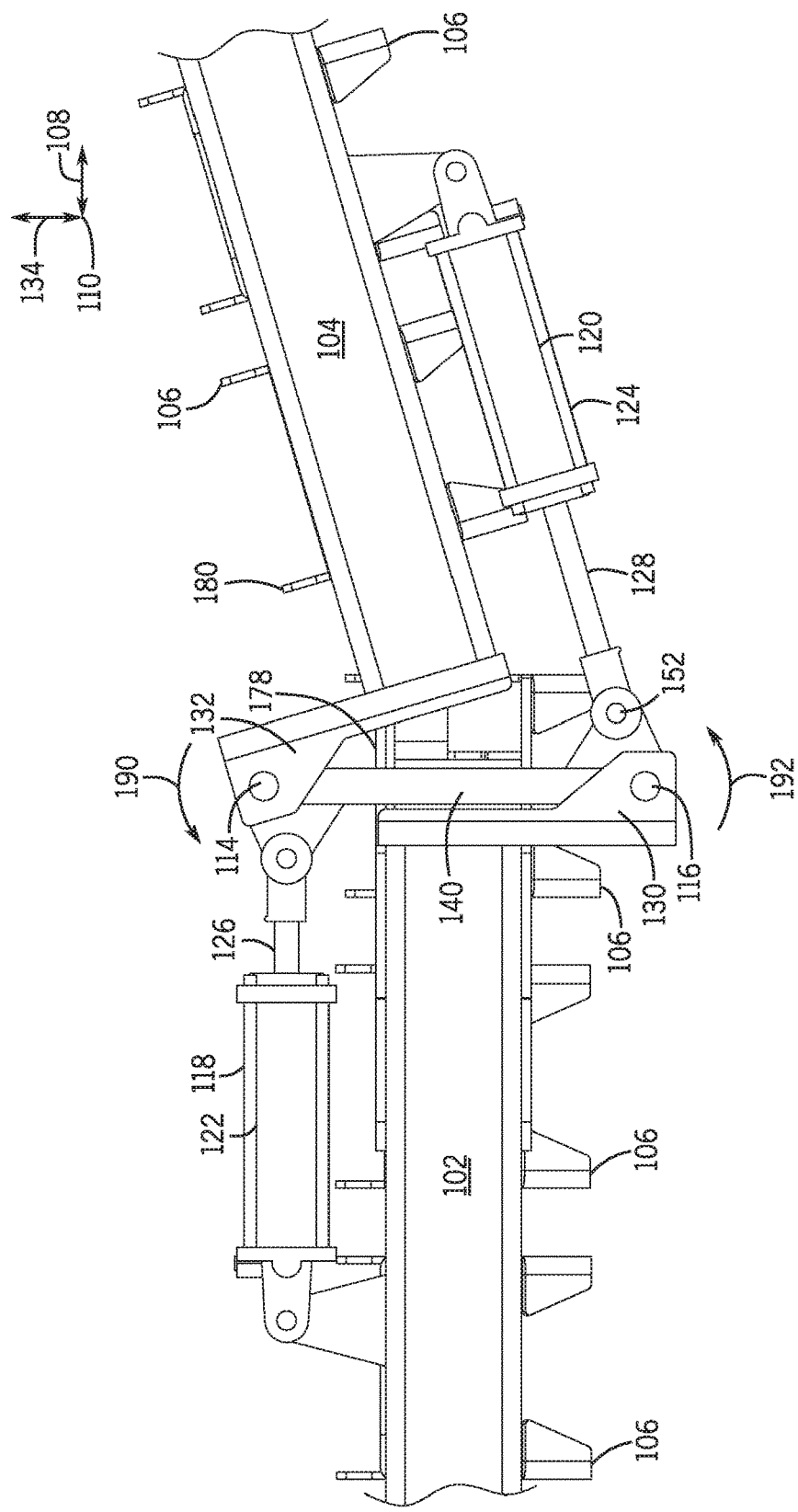
FIG. 5 is a front view of a pivot hinge assembly of FIG. 2 with a second tool bar member pivoted upwards over and above a height of a first tool bar member, in accordance with an embodiment of the present approach.

More specifically, FIG. 5 illustrates an embodiment of the pivot hinge assembly 100 having the bar member 104 pivoted upwards over and above a height of the bar member 102. Accordingly, the agricultural implement 10 may more easily turn and begin operations on an adjacent row. Because FIG. 5 includes like elements to FIGS. 2, 3, and 4, the like elements are illustrated with like element numbers. In the depicted embodiment, the piston 126 is shown as retracted when compared to FIG. 4, and the piston 128 is shown as extended, thus angularly raising the bar member 104.

In certain embodiments, a vehicle operator may activate a switch (e.g., physical switch) or soft control (e.g., graphical button on a graphical user interface) to raise the bar member 104. Accordingly, the piston 126 may be contracted into a closed position by the actuator 118 and the piston 128 may be extended by the actuator 120 to raise the bar member 104. During raising operations, the end member 132 may rotate in a direction 190 with respect to the pivot 114 while the piston 128 may rotate in a direction 192 with respect to the pivot 152. Once a desired height is reached, the actuators 118, 120 may be turned off and the pistons 126, 128 may be locked in place. In embodiments where there is close proximity between the row unit attachment members 178, 180, the piston 126 may be extended to increase a distance between the members 178, 180, and thus prevent contact.

Figure 6:
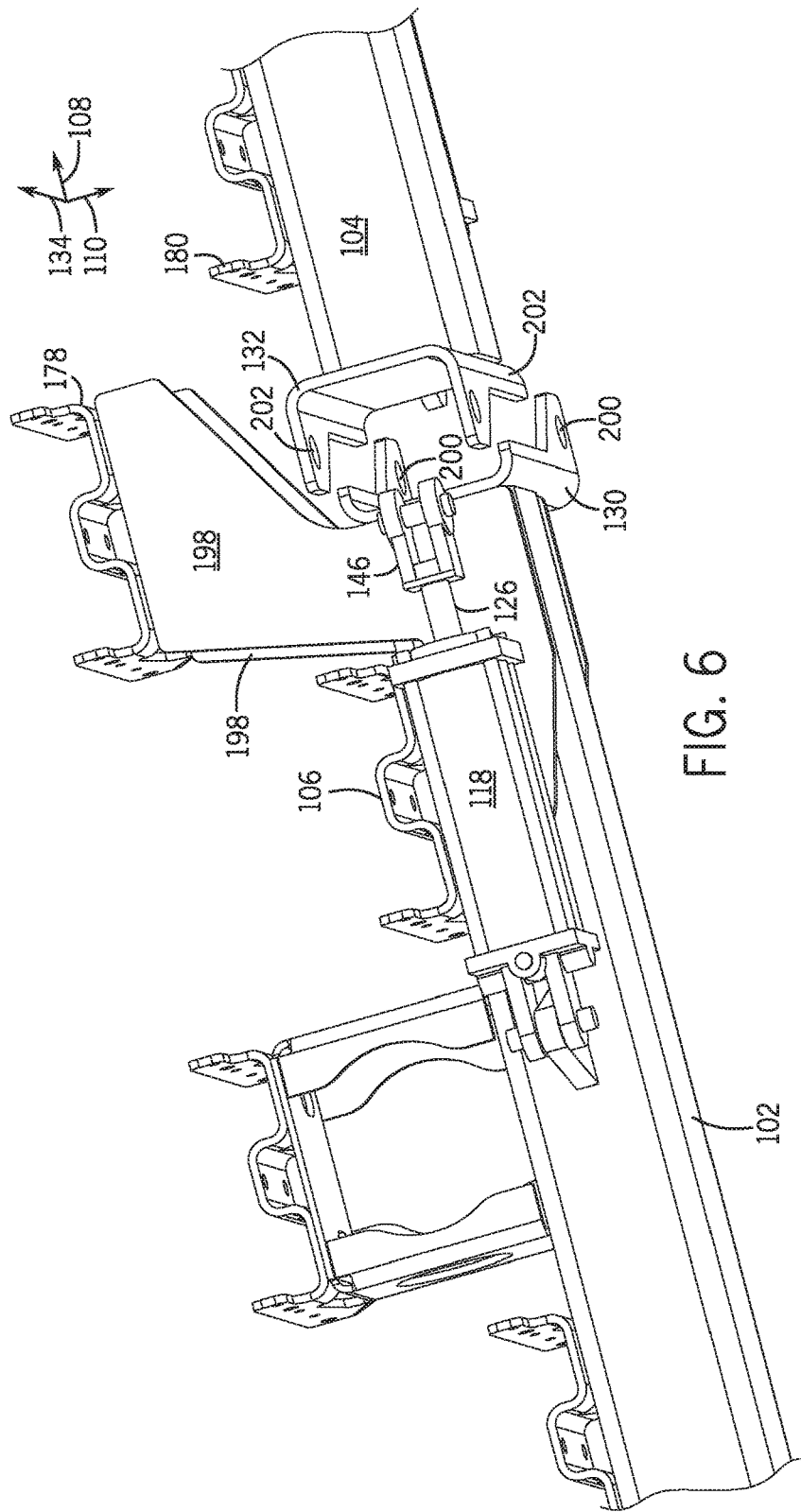
FIG. 6 is a perspective view of the pivot hinge assembly of FIG. 2 illustrating details of end members coupled to tool bar members, in accordance with an embodiment of the present approach.

FIG. 6 illustrates a perspective view of the pivot hinge assembly 100 with the hinge member 140 removed to show details of the end members 130 132. Because FIG. 6 includes like elements to FIG. 2-5, the like elements are illustrated with like element numbers. As show, the end members 130, 132, are attached to ends of the bar members 102, 104 respectively. In the depicted embodiment, the end members 130, 132 may be welded onto the bar members 102, 104, and may be manufactured out of metal sections or sheets cut and bent into desired shapes shown. Also illustrated is the row unit attachment member 178 disposed onto the bar member 102 via bar extensions 198, and the row unit attachment member 180.

Figure 7:
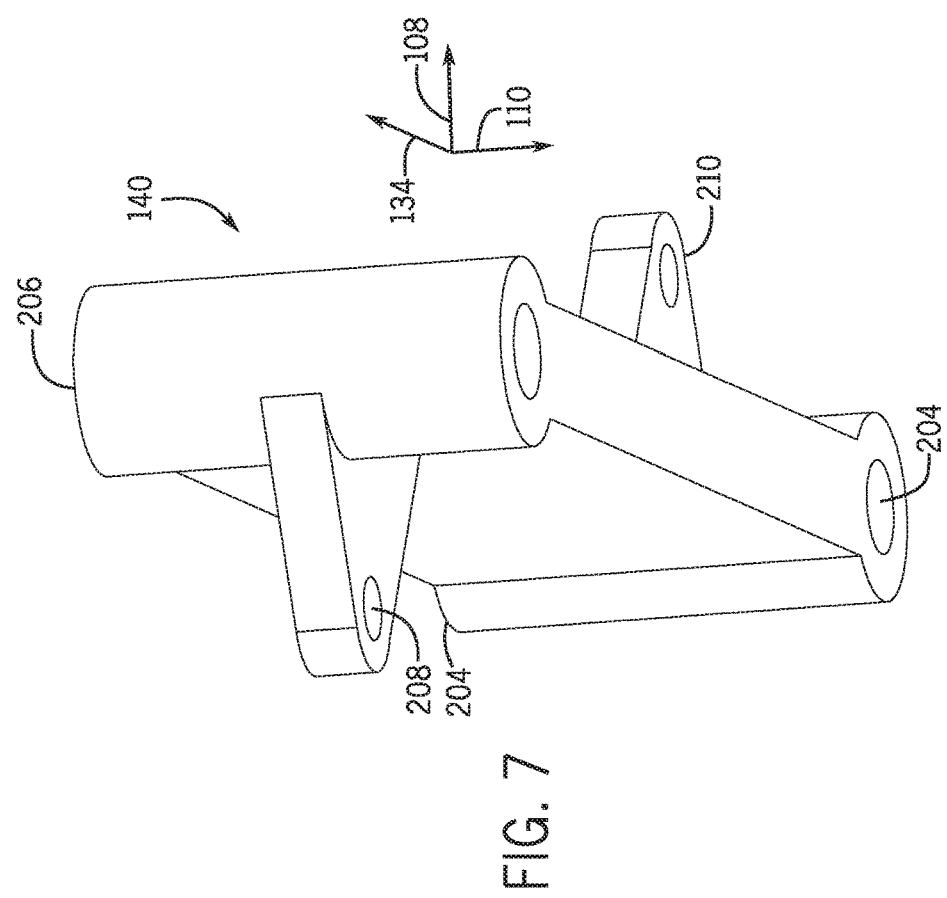
FIG. 7 is a perspective view of a hinge member the pivot hinge assembly of FIG. 2, illustrating details of certain pivot hinge member openings, in accordance with an embodiment of the present approach.

The end members 130, 132 may be attached to the hinge member 140, for example, via rods inserted into openings 200, 202. The hinge member 140 may include corresponding openings 204 and 206, as shown in FIG. 7, suitable for engaging with openings 200 and 202, respectively, of the end members 130, 132. Because FIG. 7 includes like elements to FIG. 2-6, the like elements are illustrated with like element numbers. The figure also illustrates openings 208 and 210, suitable for engaging with the pivotable piston end members 146 and 148 respectively. Accordingly, the hinge member 140 may be securely attached to both bar members 102, 104.

Figure 8:
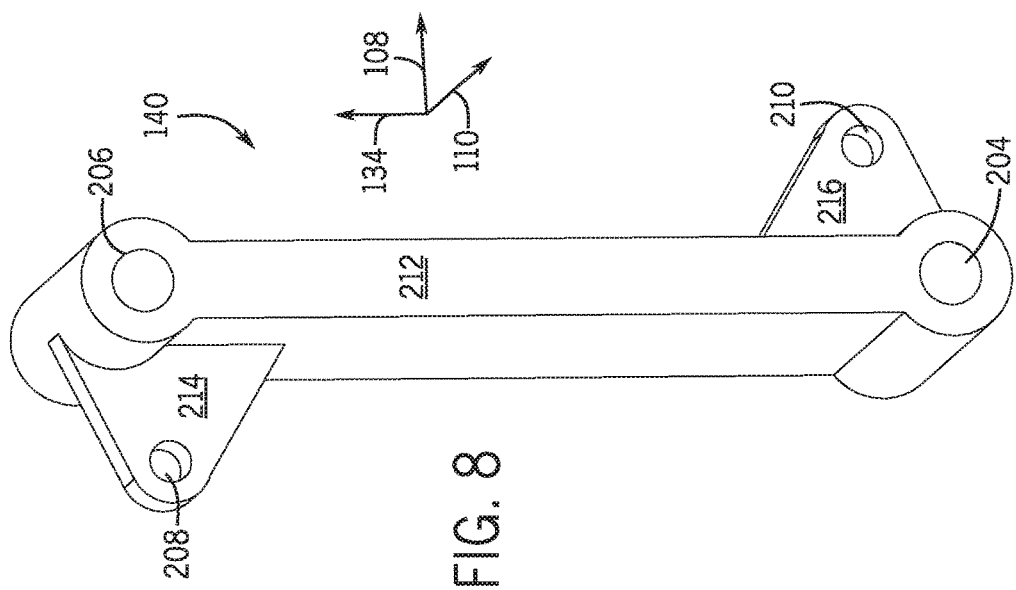
FIG. 8 is another perspective view of a hinge member the pivot hinge assembly of FIG. 2, illustrating details of certain pivot hinge member openings, in accordance with an embodiment of the present approach.

FIG. 8 is a perspective view depicting an embodiment of the hinge member 140. Because FIG. 8 includes like elements to FIG. 2-7, the like elements are illustrated with like element numbers. The figure depicts another view of the openings 208 and 210, suitable for engaging with the pivotable piston end members 146 and 148. The figure also depicts the openings 204 and 206, suitable for engaging with the end members 130, 132, for example, via a rod disposed in openings 204 and 200, and a rod disposed in openings 206 and 202. As illustrated the hinge member 140 includes a center bar 212 having the openings 204, 206 and extensions 214, 216 having the openings 208, 210, respectively.

Figure 9:
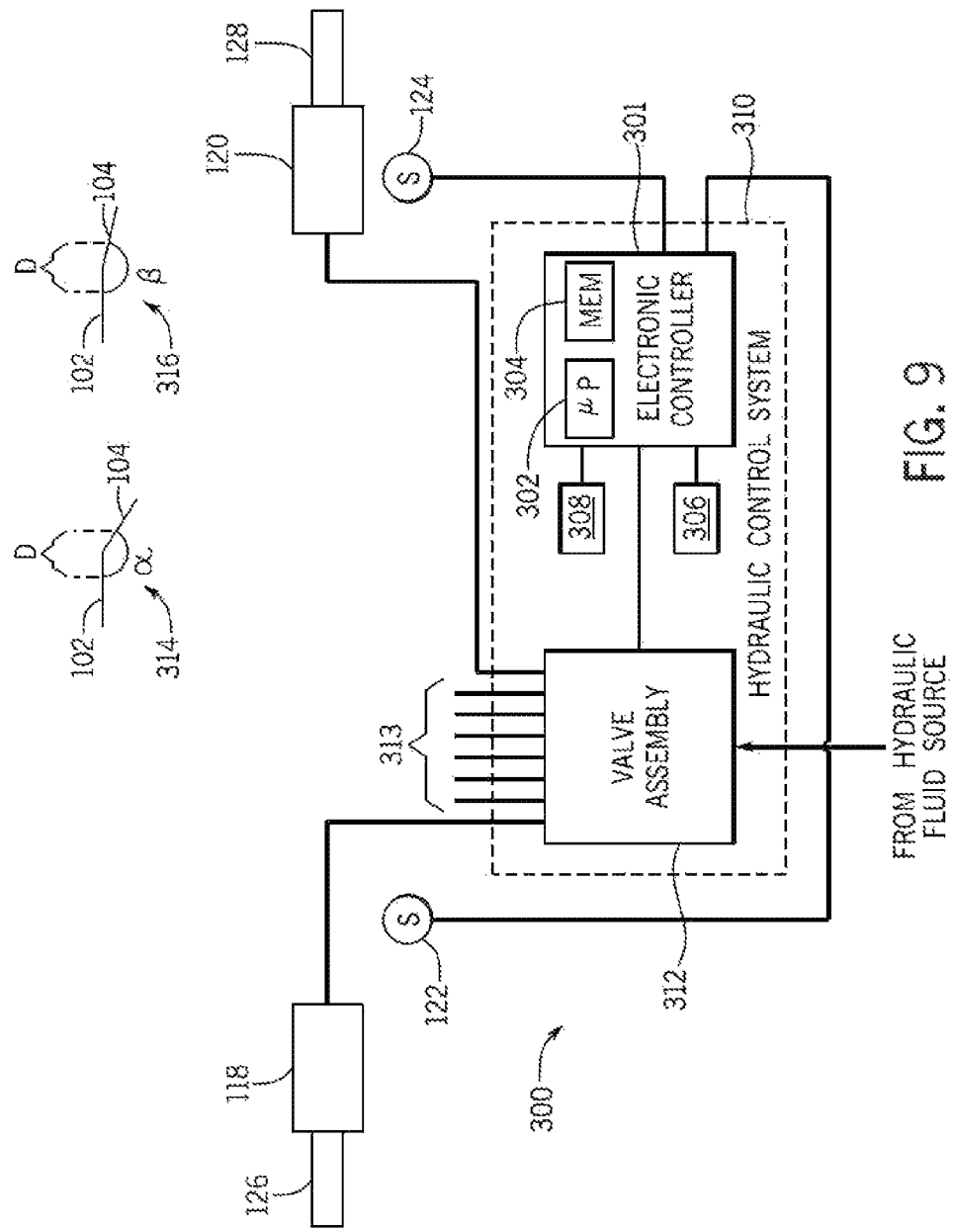
FIG. 9 is a block diagram of a control system suitable for operating the pivot hinge assembly of FIG. 2.

FIG. 9 illustrates an embodiment of a control system 300 associated with the agricultural implement 10 may be configured to control, among other things, the pivoting of the bar members 102 and/or 104 via the pivot hinge assembly 100. Portions of the control system 300 may reside in the work vehicle attached to the agricultural implement 10, while other components may be located on the agricultural implement 10. The control system 300 may generally include an electronic controller 301 having a processor 302, memory 304, a display 306, a user input device 308, and a hardware interface 310 used by the processor 302 to communicate with various sensors 122, 124 and actuators 118, 120.

As depicted, the processor 302 and/or other data processing circuitry may be operably coupled to the memory 304 to retrieve and execute instructions for managing the work vehicle and/or the planter 10. For example, these instructions may be encoded in programs that are stored in the memory 304, which may be an example of a tangible, non-transitory computer-readable medium, and may be accessed and executed by the processor 302 to facilitate performance of certain presently disclosed techniques. The memory 304 may be a mass storage device, a FLASH memory device, removable memory, or any other non-transitory computer-readable medium. Additionally and/or alternatively, the instructions may be stored in an additional suitable article of manufacture that includes at least one tangible, non-transitory computer-readable medium that at least collectively stores these instructions or routines in a manner similar to the memory 304 as described above. The control system 300 may also include the display 306 for a user to view various data regarding the work vehicle 10 and/or the agricultural implement 10 and the user input device 308 (e.g., a keyboard, mouse, touchscreen, gesture input device, etc.) to enable the user to interact with the control system 301.

In the illustrated embodiment, the control system 300 includes a hydraulic control system 310 having the electronic controller 310, display 306, and input device 308. However, other embodiments may alternatively or additionally include pneumatic and/or electronic control systems suitable for actuating the actuators 118, 120 via pneumatic and/or electrical power. In the depicted embodiment, the first sensor 122 is configured to output a first signal indicative of a first length extension of the piston 126 (e.g. between 0 and 4 ft). In addition, the second sensor 124 is configured to output a second signal indicative of a second length extension of the piston 128 (e.g. between 0 and 4 ft). In certain embodiments, each sensor 122, 124 may include a rotary potentiometer, a linear potentiometer, a linear variable differential transformer (LVDT), or another suitable device configured to output a signal indicative of a length extension of pistons 126, 128.

As illustrated, each actuator 118 120 is fluidly coupled to a valve assembly 312 of the hydraulic control system 310, and the valve assembly 312 is communicatively coupled to the electronic controller 301. The valve assembly 312 is configured to control fluid flow between a hydraulic fluid source and the hydraulic actuators 118, 120 based on control signals from the electronic controller 301. It is to be noted that the valve assembly 312 may be controlled via the electronic controller 301 to power a number of hydraulic devices in the agricultural implement 10 or towing vehicle, for example, by providing hydraulic fluid through conduits 313.

When lowering the bar member 104 (e.g., pivoting the bar member 104 towards ground), the electronic controller 301 is configured to instruct the first actuator 118 to extend the piston 126 to a desired extension length. When the sensor 122 transmits a signal indicative that the desired extension length is reached, the electronic controller 301 may then instruct the first actuator 118 to stop extending the piston 126. Likewise, the electronic controller 301 is configured to instruct the second actuator 120 to extend the piston 128 to a desired extension length. When the sensor 124 transmits a signal indicative that the desired extension length is reached, the electronic controller 301 may then instruct the second actuator 120 to stop extending the piston 128. The actuation of pistons 126, 128 may occur in a step wise fashion (e.g., actuation of piston 126 occurring first, and then followed by actuation of piston 128) or simultaneously. Accordingly, the bar member 104 may be lowered to the ground while respecting distances between row units 178, 180 disposed on sides of the pivot hinge assembly 100.

In a lowered position, the bar member 104 may be used, for example, during planting operations to better follow contours of the ground. When the agricultural implement 10 reaches a turning area (e.g., end of a planting row), the electronic controller 301 may be configured to raise the bar member 104 (e.g., pivoting the bar member 104 upwards as shown in FIG. 5). To raise the bar member 104, the electronic controller 301 may be configured to instruct the first actuator 118 to retract the piston 126 to a desired extension length. When the sensor 122 transmits a signal indicative that the desired extension length is reached, the electronic controller 301 may then instruct the first actuator 118 to stop retracting the piston 126. Likewise, the electronic controller 301 is configured to instruct the second actuator 120 to extend the piston 128 to a desired extension length. When the sensor 124 transmits a signal indicative that the desired extension length is reached, the electronic controller 301 may then instruct the second actuator 120 to stop extending the piston 128. The actuation of pistons 126, 128 may occur in a step wise fashion (e.g., actuation of piston 126 occurring first, and then followed by actuation of piston 128) or simultaneously.

Because the manufacturing length of the pistons 118, 120, and the lengths and geometries of the various components of the pivot hinge assembly 100 are known, the electronic controller 301 may position the bar member 104 at a number of angles relative to the bar member 104. For example, when the pistons 126, 128 are fully retracted, the bar member 104 may be positioned parallel to the bar member 102. Then, by extending and/or retracting the pistons 126, 128, the electronic controller 301 may position the bar member 104 to "dip" towards the ground at a variety of angles relative to the bar member 102. For example, a first angle α 314 is depicted, and a second angle β 316 is also depicted. Both angles 314, 316 include the same distance D that enable adjoining row units 178, 180 to maintain an even spacing or the spacing as other row units 106.

Likewise, by extending and/or retracting the pistons 126, 128, the electronic controller 301 may position the bar member 104 to upwardly from the ground at a variety of angles relative to the bar member 102. The actuations of the pistons 126, 128, may additionally respect distances between row units, such as row units 178, 180, to maintain a desired relative distance to each other without abutting against each other.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
a tow bar configured to couple to a hitch assembly;
a tool bar pivot hinge assembly comprising two pivot points; and
a first tool bar member mechanically coupled to a second tool bar member via the tool bar pivot hinge assembly; the first tool bar member extending transversely from the tow bar, wherein the tool bar pivot hinge assembly provides for an axis of rotation of the second tool bar member about the first tool bar member via the first pivot point and additionally provides for an extension of the second tool bar member away from the first tool bar member, wherein the extension of the second tool bar member away from the first tool bar member positions the first pivot point from a first distance relative to the first tool bar member to a second distance relative to the first tool bar member different than the first distance.

2. The agricultural implement system of claim 1, wherein the tool bar pivot hinge assembly comprises a first and a second actuator, wherein the first actuator is fixedly coupled to the first tool bar member and extendedly coupled to the second tool bar member and wherein the second actuator is fixedly coupled to the second tool bar member and extendedly coupled to the first tool bar member.

3. The agricultural implement system of claim 2, wherein the first actuator comprises a first piston configured to extend outwardly towards the second tool bar member and wherein the second actuator comprises a second piston configured to extend outwardly towards the first tool bar member.

4. The agricultural implement system of claim 3, wherein the tool bar pivot hinge assembly comprises a hinge member having a first and a second openings, wherein the hinge member is pivotably coupled to the first piston via the first opening and the hinge member is pivotably coupled to the second piston via the second opening.

5. The agricultural implement system of claim 4, wherein the tool bar pivot hinge assembly comprises a first end member fixedly coupled to the second tool bar member and a second end member fixedly coupled to the first tool bar member, wherein the hinge member is rotatively coupled to both the first and the second end members.

6. The agricultural implement system of claim 5, wherein the first end member comprises two first end openings defining the first pivot point and wherein the second end member comprises two second end openings defining the second pivot point, and wherein the hinge member is rotatively coupled to both the first and the second end members via the first and the second end openings.

7. The agricultural implement system of claim 1, wherein the agricultural implement system comprises a planter.

8. The agricultural implement system of claim 7, comprising a first row unit disposed on a first side of the tool bar pivot hinge assembly and a second row unit disposed on a second side of the tool bar pivot hinge assembly opposite the first side, wherein the extension of the second tool bar member away from the first tool bar member maintains an even spacing between the first row unit and the second row unit.

9. The agricultural implement system of claim 1, comprising a control system configured to control the rotation and the extension of the second tool bar member.

10. An agricultural implement system, comprising:
a tow bar configured to couple to a hitch assembly;
a tool bar pivot hinge assembly comprising a first end member, a second end member, and a hinge member rotatively attached to the first and the second end members; and
a first tool bar member mechanically coupled to a second tool bar member via the first end member and the second end member; the first tool bar member extending transversely from the tow bar, wherein the tool bar pivot hinge assembly provides for an axis of rotation of the second tool bar member about the first tool bar member about a first pivot point and additionally provides for an extension of the second tool bar member away from the first tool bar member, wherein the extension of the second tool bar member away from the first tool bar member positions the first pivot point from a first distance relative to the first tool bar member to a second distance relative to the first tool bar member different than the first distance.

11. The agricultural implement system of claim 10, wherein the first end member comprises two first end openings defining the first pivot point and wherein the second end member comprises two second end openings defining a second pivot point, and wherein the hinge member is rotatively coupled to both the first and the second end members via the first and the second end openings.

12. The agricultural implement system of claim 10, wherein the agricultural implement system comprises a planter.

13. The agricultural implement system of claim 12, comprising a first row unit disposed on a first side of the tool bar pivot hinge assembly and a second row unit disposed on a second side of the tool bar pivot hinge assembly opposite the first side, wherein the extension of the second tool bar member away from the first tool bar member maintains an even spacing between the first row unit and the second row unit.

14. The agricultural implement system of claim 10, wherein the tool bar pivot hinge assembly comprises a first and a second actuator, wherein the first actuator is fixedly coupled to the first tool bar member and extendedly coupled to the second tool bar member and wherein the second actuator is fixedly coupled to the second tool bar member and extendedly coupled to the first tool bar member.

15. The agricultural implement system of claim 14, comprising a control system configured to control the rotation and the extension of the second tool bar member by actuating the first actuator, the second actuator, or a combination thereof.

16. An agricultural implement comprising:
   a tow bar configured to couple to a hitch assembly;
   a tool bar pivot hinge assembly comprising two pivot points;
   a first tool bar member mechanically coupled to a second tool bar member via the tool bar pivot hinge assembly; the first tool bar member extending transversely from the tow bar, wherein the tool bar pivot hinge assembly provides for an axis of rotation of the second tool bar member about the first tool bar member via a first pivot point of the two pivot points and additionally provides for an extension of the second tool bar member away from the first tool bar member, wherein the extension of the second tool bar member away from the first tool bar member positions the first pivot point from a first distance relative to the first tool bar member to a second distance relative to the first tool bar member different than the first distance; and
   a control system operatively coupled to the tool bar pivot hinge assembly and configured to:
      rotate the second tool bar member about the first tool bar member; and
      extend the second tool bar member away from the first tool bar member.

17. The agricultural implement system of claim 16, wherein the tool bar pivot hinge assembly comprises a first and a second actuator, wherein the first actuator is fixedly coupled to the first tool bar member and extendedly coupled to the second tool bar member and wherein the second actuator is fixedly coupled to the second tool bar member and extendedly coupled to the first tool bar member, and wherein the control system is configured to:
   rotate the second tool bar member about the first tool bar member by controlling the first actuator, the second actuator, or a combination thereof; and
   extend the second tool bar member away from the first tool bar member by controlling the first actuator, the second actuator, or a combination thereof.

18. The agricultural implement system of claim 16, wherein the agricultural implement is a planter comprising a first row unit disposed on a first side of the tool bar pivot hinge assembly and a second row unit disposed on a second side of the tool bar pivot hinge assembly opposite the first side, wherein the control system is configured to control the extension of the second tool bar member away from the first tool bar member to maintain a desired spacing D between the first row unit and the second row unit.

19. The system of claim 16, wherein the control system is configured to maintain the same desired spacing D at a first rotation angle of the second tool bar member about the first tool bar member and at a second rotation angle the second tool bar member about the first tool bar member.

20. The agricultural implement system of claim 16, wherein control system is configured to raise the second tool bar member above the first tool bar member.

* * * * *